United States Patent
Van Raalten et al.

(10) Patent No.: US 11,098,200 B2
(45) Date of Patent: Aug. 24, 2021

(54) PRODUCTION OF CRYSTALLINE CARBON STRUCTURE NETWORKS

(71) Applicant: CarbonX IP 3 B.V., Amsterdam (NL)

(72) Inventors: Rutger Alexander David Van Raalten, Delft (NL); Daniela Sordi, Delft (NL)

(73) Assignee: CARBONX IP 3 B.V., Amsterdam (NL)

( * ) Notice: Subject to any disclaimer, the term of this patent is extended or adjusted under 35 U.S.C. 154(b) by 134 days.

(21) Appl. No.: 16/310,750

(22) PCT Filed: Jun. 28, 2017

(86) PCT No.: PCT/EP2017/065994
§ 371 (c)(1),
(2) Date: Dec. 17, 2018

(87) PCT Pub. No.: WO2018/002137
PCT Pub. Date: Jan. 4, 2018

(65) Prior Publication Data
US 2019/0127588 A1  May 2, 2019

(30) Foreign Application Priority Data

Jun. 28, 2016 (EP) .................................. EP16176599
Jan. 6, 2017 (EP) .................................. EP17150513

(51) Int. Cl.
C09C 1/50 (2006.01)
C01B 32/05 (2017.01)
C01B 32/152 (2017.01)
C01B 32/158 (2017.01)
C01B 32/182 (2017.01)

(52) U.S. Cl.
CPC ............. C09C 1/50 (2013.01); C01B 32/05 (2017.08); C01B 32/152 (2017.08); C01B 32/158 (2017.08); C01B 32/182 (2017.08); C01P 2004/03 (2013.01); C01P 2004/13 (2013.01); C01P 2004/16 (2013.01); C01P 2004/45 (2013.01); C01P 2006/10 (2013.01); C01P 2006/22 (2013.01); C01P 2006/32 (2013.01); C01P 2006/40 (2013.01)

(58) Field of Classification Search
CPC ....................................................... C09C 1/50
See application file for complete search history.

(56) References Cited

U.S. PATENT DOCUMENTS

| | | | |
|---|---|---|---|
| 2,672,402 A | 3/1954 | Stokes | |
| 3,494,740 A | 2/1970 | Speck | |
| 3,642,446 A * | 2/1972 | Heller | C08K 3/04 423/455 |
| 4,213,957 A * | 7/1980 | Hunt | C09C 1/50 423/275 |
| 4,292,291 A | 9/1981 | Rothbuhr et al. | |
| 4,636,375 A | 1/1987 | Rothbuhr et al. | |
| 8,835,351 B2 * | 9/2014 | Canelon | B01J 35/0026 502/436 |
| 9,617,156 B2 * | 4/2017 | Kowlgi | H05K 999/99 |
| 2004/0248731 A1 | 12/2004 | Vogel et al. | |
| 2005/0249657 A1 | 11/2005 | Kutsovsky et al. | |
| 2013/0244023 A1 | 9/2013 | Kowlgi et al. | |
| 2015/0064099 A1 | 3/2015 | Nester et al. | |

FOREIGN PATENT DOCUMENTS

| | | |
|---|---|---|
| GB | 1514130 A | 6/1978 |
| WO | WO-00/32701 | 6/2000 |

OTHER PUBLICATIONS

Moon et al., "Synthesis of Length-Controlled Aerosol Carbon Nanotubes and Their Dispersion Stability in Aqueous Solution", Langmuir, vol. 25, No. 3, Feb. 3, 2009, pp. 1739-1743.
International Search Report issued in PCT/EP2017/065994, dated Sep. 27, 2017.
Written Opinion of the International Searching Authority issued in PCT/EP2017/065994, dated Sep. 27, 2017.

* cited by examiner

*Primary Examiner* — Stuart L Hendrickson
(74) *Attorney, Agent, or Firm* — Foley & Lardner LLP

(57) ABSTRACT

The invention pertains to a process for the production of crystalline carbon structure networks in a reactor 3 which contains a reaction zone 3*b* and a termination zone 3*c*, by injecting a thermodynamically stable micro-emulsion c, comprising metal catalyst nanoparticles, into the reaction zone 3*b* which is at a temperature of above 600° C., preferably above 700° C., more preferably above 900° C., even more preferably above 1000° C., more preferably above 1100° C., preferably up to 3000° C., more preferably up to 2500° C., most preferably up to 2000° C., to produce crystalline carbon structure networks e, transferring these networks e to the termination zone 3*c*, and quenching or stopping the formation of crystalline carbon structure networks in the termination zone by spraying in water d.

15 Claims, 3 Drawing Sheets

PRODUCTION OF CRYSTALLINE CARBON STRUCTURE NETWORKS

CROSS-REFERENCE TO RELATED APPLICATIONS

This application is the National Phase of International Patent Application No. PCT/EP2017/065994, filed Jun. 28, 2017, published on Apr. 1, 2018 as WO 2018/002137 A1, which claims priority to European Application No. 16176599.5, filed Jun. 28, 2016 and European Application No. 17150513.4, filed Jan. 6, 2017. The contents of these applications are herein incorporated by reference in their entirety.

FIELD OF THE INVENTION

The invention is in the field of manufacturing crystalline carbon structure networks with improved properties, and directed to new methods for manufacturing such structure networks. The invention is particularly in the field of carbon black manufacturing.

BACKGROUND TO THE INVENTION

Carbon black industry focuses on providing an allotrope of carbon mainly differing from graphite and amorphous carbon by its physical arrangement, for use in manufacturing rubber articles, such as tires, etc., in polygraphy, electronics and cable coatings, in the production of varnishes and paints, including use applications in which reinforcing and/or pigmentary properties of carbon black are required.

Various different processes or techniques are known in the art for producing carbon black. Carbon black is mainly produced by partial combustion processes, starting from a carbon containing gas such as methane or acetylene. This process is sometimes referred to as a furnace carbon black producing process, and it employs a furnace having a burner or combustion chamber followed by a reactor. The furnace process is typically characterized by low oxygen levels, low densities, short residence times and high temperatures. As a first step of the furnace carbon black production process, hydrocarbons are atomized at typical temperatures from 1200 to 1900° C., as is described in Ullmanns Encyklopadie der technischen Chemie, Volume 14, page 637-640 (1977). To that end, a zone having a high energy density is produced by burning a fuel gas or a liquid fuel with oxygen or air, and the carbon black raw material is injected thereto. The carbon black feedstock is atomized in these hot combustion conditions; oxygen levels are on average supplied at a rate of two volumes of carbon black feedstock to about one volume of oxygen, in order to achieve the oxygen being completely consumed in the combustion process. The structure and/or the porosity of the carbon black end product may be influenced by the presence of alkali metal or alkaline earth metal ions during the carbon black formation, and such additives are therefore frequently added in the form of aqueous solutions, which are sprayed onto the carbon black raw material agglomerates. The reaction is terminated only by the injection of water (quenching) and the carbon black is collected at a temperature of about 200-250° C., and separated from the waste gas by means of conventional separators or filters. Because of its low bulk density, the resulting carbon black is then granulated, for instance carried out in a pelletizing machine with the addition of water to which small amounts of a pelletizing auxiliary may be added. In chronological order, and by now means limiting the art on furnace carbon black technology, U.S. Pat. Nos. 2,672,402, 4,292,291, 4,636,375, WO2000/032701 and US 2004/0248731 provide a description of traditional or conventional carbon black production. Their contents are herewith incorporated by reference. Of note, there are also alternative processes such as the lamp black process, thermal black, acetylene black and channel black process which all are variations on the process described above, in the end producing a type of carbon black. Most innovative is the plasma black carbon process, advantageously avoiding direct carbon dioxide emissions, and reducing fossil fuel consumption. In essence, these oxygen-poor carbon black manufacture methods are very similar, except for finding different ways of yielding pyrolysis temperature conditions. Hitherto the industry is however still struggling to produce carbon black through oxygen-poor reducing processes with parameters comparable to those of carbon black produced through traditional partial combustion.

GB1514130 (in 1976) also discloses a method of producing carbon black from liquid hydrocarbons, by partial combustion and cracking of the hydrocarbons in a furnace plant. An emulsion of water and a liquid hydrocarbon is introduced into the combustion zone of a furnace, with an aim to use the water to optimize atomisation of the hydrocarbon. The process of the "thermal" atomisation of the liquid hydrocarbons, which themselves are only partly capable of being evaporated, is due to the explosion-like evaporation of the water at the moment when the emulsion is passed into the hot combustion zone. The process results in higher carbon black yields and shorter reaction times. The type of emulsion that could be used is not described. No different structures are reported.

U.S. Pat. No. 3,494,740 (dated 1970) also discusses carbon black production by introducing into the reaction zone of a carbon black furnace an additive comprising a metal selected from the group consisting of nickel, vanadium, iron, cobalt, and mixtures thereof, in an amount within the range of from 1 to 80 parts by weight per million parts by weight of the hydrocarbon feedstock to said furnace. The metal may be provided in water, oil or emulsion, in order to realize uniform dispersion in the hydrocarbon feed. The carbon black properties are mentioned in table 1. The type of emulsion that could be used is not described. No different structures are reported.

US2015/064099 relates to methods for production of carbon black using preheated feedstock with fouling control. Water is used for quenching.

SUMMARY TO THE INVENTION

The inventors found that well-established reducing (pyrolysis) or oxidizing (combustion) carbon black manufacturing processes can be used to produce networks of crystalline carbon structures having all kinds of advantageously improved electrical, mechanical and thermal properties, by introducing the concept of single-phase emulsification using thermodynamically stable micro-emulsions of the w/o or bicontinuous type, with metal catalyst nanoparticles, to conventional (furnace) carbon black production. The invention thus relates to a process for producing crystalline carbon structure networks by providing a thermodynamically stable single-phase emulsion comprising an oil, preferably C14 of higher, more preferably a carbon black feedstock oil, water and at least one surfactant, and also metal catalyst nanoparticles, and subjecting the emulsion, preferably the emulsified carbon black feedstock, to a carbon black manufacturing process, carbonizing said carbon black feedstock at increased temperatures above 600° C., preferably above 700° C., more preferably above 900° C., even more preferably above 1000° C., most preferably above 1100° C., preferably up to 3000° C., more preferably up to 2500° C., particularly up to 2000° C.

Throughout the text and claims, a 'single-phase emulsion' is a water-in-oil (w/o) micro-emulsion or a bicontinuous micro-emulsion comprising metal catalyst nanoparticles.

In a related aspect, the invention pertains to the use of such a single-phase emulsion, preferably an emulsified carbon black feedstock (i.e. a single-phase emulsion comprising carbon black feedstock) for carbonizing the emulsion in a carbon black manufacture process, preferably a furnace carbon black manufacture process, thus obtaining crystalline carbon structure networks. The emulsion is preferably sprayed and atomized into the reactor at the above elevated temperatures. Again, it was found that the single-phase emulsion should be a w/o or bicontinuous micro-emulsion comprising metal catalyst nanoparticles.

Through the eyes of the skilled person, the use of water should at least be minimized and preferably banned from the reaction sector in a traditional carbon black manufacturing process to obtain proper yields and preferred spherical carbon black structures, where water is only to be used for terminating the carbon black reaction further downstream in the reactor. At best water is sometimes used as a carrier in spraying alkali metal and alkaline earth metal ions onto the carbon black material, where in the final stages of the agglomeration process the porosity of the carbon black product could be fine-tuned to the market needs. Depending on the source, carbon black feedstock may in fact even be dewatered prior to introduction to the process, in order to increasing the fuel density and optimizing atomization. With that wide-spread reluctance of using any—let alone much—water during traditional carbon black manufacture, other than for quenching purposes in the closing stages, the idea of emulsifying the carbon black feedstock prior to atomization goes beyond the skilled person's imaginations. However, the inventors found that amending the conventional carbon black manufacture by atomizing a stable one-phase emulsion comprising a carbon black feedstock oil into the reactor has a dramatic impact in that a novel crystalline carbon material is obtained comprising of a network of structures, typically nanofibers, instead of the normally obtained amorphous carbon black based on aggregates from spherical particles. The crystalline carbon network structures are so different in morphology that they constitute properties that are different and even superior to carbon black aggregates, some of which have been exploited further below.

Without wishing to be bound by any theory, the inventors believe that the orientation and structuring of the surfactant molecules, oil phase and water phase together with the metal catalyst nanoparticles give rise to the network-forming process that is unique to the new material and to the process. It was found that metal catalyst nanoparticles are essential. The micro- and macro-structures of the emulsions (either water-in-oil or bicontinuous) are thought to act as a precursor/blue-print for the final carbon structure network, of which the carbon-containing fractions (oil phase and surfactant) will form the fibers and junctions, whilst the water fraction helps orienting the oil/surfactant phase and network porosity. The presence of a metal catalyst promotes the carbonization of the carbon components into a fiber structure instead of the normally obtained spherical orientation. A blend of an immiscible oil and water phase will not yield these structures, i.e. without a metal catalyst in a thermodynamically stable matrix present. Once the emulsion is atomized at high temperatures the carbonization process instantly "freezes" the carbon fractions in its emulsion-structure in the presence of a metal catalyst, while the water evaporates, leaving a network of (nano)fibers. In that process, the inventors found it is key to provide the carbon raw material, i.e. the oil, such as carbon black feedstock, in the form of a single-phase emulsion as described above, to the atomization process. The inventors also found that a mere mixture of water and feedstock or otherwise thermodynamically instable emulsions are detriment to the process, and will not yield the crystalline carbon structure networks. Further evidence is provided below.

The inventors also found that the single-phase emulsions subjected to atomization and subsequent carbonization should comprise metal nanoparticles which act as catalyzers in forming these crystalline networks. An increasing concentration of metal catalyst nanoparticles further enhances yields. It is essential to use bicontinuous or water-in-oil (w/o) micro-emulsions, wherein the emulsions comprise metal catalyst nanoparticles, which emulsions comprise of a continuous oil/surfactant phase thus already forming a network structure. Bicontinuous micro-emulsions are most preferred.

EMBODIMENTS OF THE INVENTION

Figure 1A:
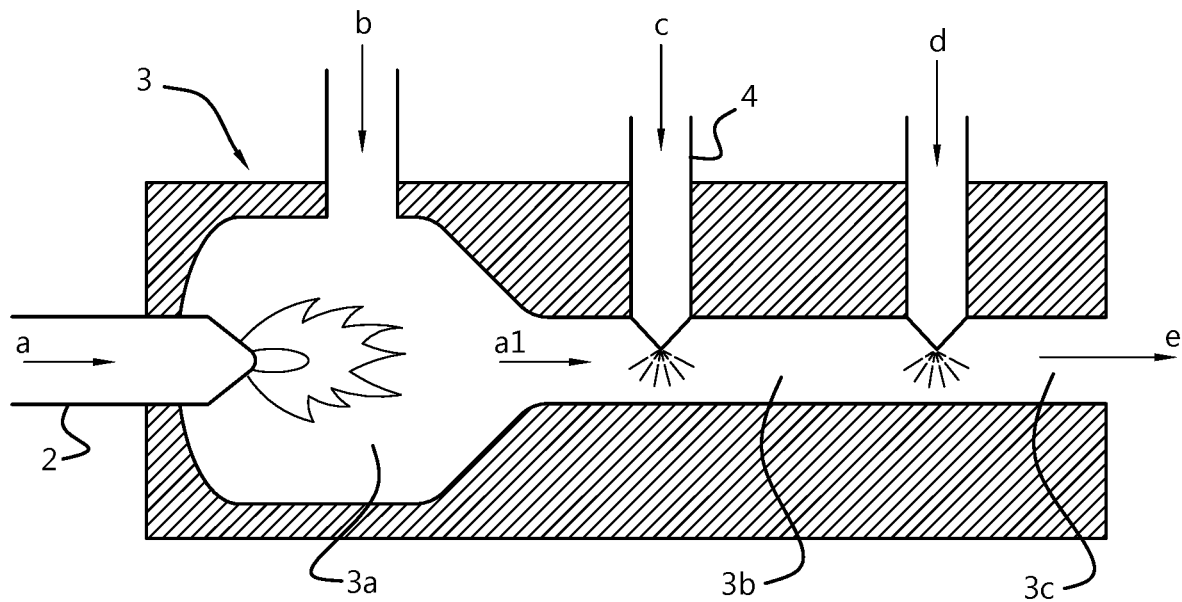
FIG. 1A is a schematic diagram of a continuous furnace carbon black producing process in accordance with the present invention which contains, along the axis of the reactor 3, a combustion zone 3a, a reaction zone 3b and a termination zone 3c, by producing a stream of hot waste gas a1 in the combustion zone by burning a fuel a in an oxygen-containing gas b and passing the waste gas a1 from the combustion zone 3a into the reaction zone 3b, spraying (atomizing) a single-phase emulsion c in the reaction zone 3b containing the hot waste gas, carbonizing said emulsion at increased temperature, and quenching or stopping the reaction in the termination zone 3c by spraying in water d, to obtain crystalline carbon structure networks e according to the invention.

1. A process for the production of crystalline carbon structure networks in a reactor 3 which contains a reaction zone 3b and a termination zone 3c, by injecting a water-in-oil or bicontinuous micro-emulsion c comprising metal catalyst nanoparticles, into the reaction zone 3b which is at a temperature of above 600° C., preferably above 700° C., more preferably above 900° C., even more preferably above 1000° C., more preferably above 1100° C., preferably up to 3000° C., more preferably up to 2500° C., most preferably up to 2000° C., to produce crystalline carbon structure networks e, transferring these networks e to the termination zone 3c, and quenching or stopping the formation of crystalline carbon structure networks in the termination zone by spraying in water d.
2. The process according to embodiment 1, said reactor being a furnace carbon black reactor 3 which contains, along the axis of the reactor 3, a combustion zone 3a, a reaction zone 3b and a termination zone 3c, by producing a stream of hot waste gas a1 in the combustion zone by burning a fuel a in an oxygen-containing gas b and passing the waste gas a1 from the combustion zone 3a into the reaction zone 3b, spraying a water-in-oil or bicontinuous micro-emulsion c comprising metal catalyst nanoparticles, in the reaction zone 3b containing the hot waste gas, carbonizing said emulsion at a temperature of above 600° C., preferably above 700° C., more preferably above 900° C., even more preferably above 1000° C., more preferably above 1100° C., preferably up to 3000° C., more preferably up to 2500° C., most preferably up to 2000° C., and quenching or stopping the reaction in the termination zone 3c by spraying in water d, to yield crystalline carbon structure networks e.
3. The process according to any one of the preceding embodiments, wherein the oil phase in the emulsion is aromatic and/or aliphatic, preferably comprising at least 50 wt % C14 or higher, based on the total weight of the oil phase.
4. The process according to any one of the preceding embodiments, said emulsion comprising at least 1 mM metal catalyst nanoparticles, preferably having an average particle size between 1 and 100 nm.
5. A crystalline carbon structure network obtainable by the process according to any one of the preceding embodiments, wherein said carbon structures are chemically interconnected through a multitude of junctions, including Y- and H-junctions.
6. The network according to embodiment 5, having at least one, preferably at least two, more preferably at least three, most preferably all of the following properties:
    (i) Iodine Adsorption Number (IAN) of at least 250 mg/g according to ASTM D1510;
    (ii) Nitrogen Surface Area (N2SA) of at least 250 m2/g according to ASTM D6556;
    (iii) Statistical Thickness Surface Area (STSA) of at least 120 m2/g according to ASTM D6556;
    (iv) Oil Absorption Number (OAN) of at least 150 cc/100 g according to ASTM D2414.
7. The network according to embodiment 5 or 6, wherein said structures have an average thickness of 1-400 nm, preferably between 5 and 350 nm, more preferably up to 100 nm, in one embodiment between 50 and 100 nm, and/or an average length in the range of 100-10000 nm, preferably 200-5000 nm, more preferably 500-5000 nm; and/or wherein the structures have an average aspect ratio of length to thickness of at least 2.
8. A composite comprising carbon structure networks according to any one of embodiments 5-7, further comprising one or more polymers, for instance for adding mechanical strength, electrical conductivity or thermal conductivity to said polymer-based composite, and wherein said networks are in any amount of 1-70 wt %, preferably 10-50 wt %, more preferably between 20-40 wt %, based on the total polymer weight in the composite.
9. The composite according to embodiment 8, showing an E modulus increasing with network concentration as measured according to ISO 527.
10. Use of an emulsified carbon black feedstock in a carbon black manufacture process, preferably a furnace carbon black manufacture process, for producing crystalline carbon structure networks.
11. A process for the semi-batch production of the crystalline carbon structure networks in a reactor 3 where a water-in-oil or bicontinuous micro-emulsion c comprising metal catalyst nanoparticles is injected from the top of the reactor 3, preferably through spraying using an aerosol inlet 4, to obtain an aerosol, and wherein said networks e are formed at an increased temperature of at least 600° C., preferably 700-1200° C. and deposited at the bottom of the reactor, and wherein the increased temperature is obtained using pyrolysis (e.g. heat source outside reactor, using N2, depleted of oxygen) or by combustion (heat source inside reactor, using air or oxygen).
12. A process for the continuous production of the crystalline carbon structure networks in a reactor 3 where a water-in-oil or bicontinuous micro-emulsion c comprising metal catalyst nanoparticles is injected from the top of the reactor 3, said reactor preferably being a thermal black reactor, preferably through spraying using an aerosol inlet 4, to obtain an aerosol, and wherein said networks e are formed at an increased temperature of at least 600° C., preferably 700-1200° C. and deposited at the bottom of the reactor, and wherein the increased temperature is obtained using combustion (heat source inside reactor, using air or oxygen), but wherein the emulsion is injected only under pyrolysis conditions.

DETAILED DESCRIPTION

The invention can be described best as a modified carbon black manufacturing process, wherein 'modified' is understood that a suitable oil, preferably an oil comprising at least 14 C atoms (>C14) such as carbon black feedstock oil (CBFS), is provided to the reaction zone of a carbon black reactor as part of a single-phase emulsion, being a thermodynamically stable micro-emulsion, comprising metal catalyst nanoparticles. The emulsion is preferably provided to the reaction zone by spraying, thus atomizing the emulsion to droplets. While the process can be carried out batch or semi-batch wise, the modified carbon black manufacturing process is advantageously carried out as a continuous process. The single-phase emulsion is a micro-emulsion comprising metal catalyst nanoparticles. The preferred single-phase emulsion comprises CBFS oil, and may be referred to as 'emulsified CBFS' in the context of the invention.

In one embodiment, the invention pertains to a process for the production of the crystalline carbon structure networks according to the invention in a reactor 3 which contains a reaction zone 3b and a termination zone 3c, by injecting a single-phase emulsion c, being a micro-emulsion comprising metal catalyst nanoparticles, preferably a CBFS-comprising emulsion, according to the invention into the reaction zone 3b which is at a temperature of above 600° C., preferably above 700° C., more preferably above 900° C., even more preferably above 1000° C., more preferably above 1100° C., preferably up to 3000° C., more preferably up to 2500° C., most preferably up to 2000° C., to produce crystalline carbon structure networks e, transferring these networks e to the termination zone 3c, and quenching or stopping the formation of crystalline carbon structure networks in the termination zone by spraying in water d. The single-phase emulsion is preferably sprayed into the reaction zone. Reference is made to FIG. 1A.

In a preferred embodiment, the invention pertains to a process for the production of the crystalline carbon structure networks according to the invention in a furnace carbon black reactor 3 which contains, along the axis of the reactor 3, a combustion zone 3a, a reaction zone 3b and a termination zone 3c, by producing a stream of hot waste gas a1 in the combustion zone by burning a fuel a in an oxygen-containing gas b and passing the waste gas a1 from the combustion zone 3a into the reaction zone 3b, spraying (atomizing) a single-phase emulsion c according to the invention, preferably a micro-emulsion comprising metal catalyst nanoparticles, preferably a CBFS-comprising emulsion, in the reaction zone 3b containing the hot waste gas, carbonizing said emulsion at increased temperatures (at a temperature of above 600° C., preferably above 700° C., more preferably above 900° C., even more preferably above 1000° C., more preferably above 1100° C., preferably up to 3000° C., more preferably up to 2500° C., most preferably up to 2000° C.), and quenching or stopping the reaction (i.e. the formation of crystalline carbon structure networks e) in the termination zone 3c by spraying in water d. The reaction zone 3b comprises at least one inlet (preferably a nozzle) for introducing the emulsion, preferably by atomization. Reference is made to FIG. 1A.

Residence times for the emulsion in the reaction zone of the furnace carbon black reactor can be relatively short, preferably ranging from 1-1000 ms, more preferably 10-100 ms.

In accordance with conventional carbon black manufacturing processes, the oil phase can be aromatic and/or aliphatic, preferably comprising at least 50 wt % C14 or higher, more preferably at least 70 wt % C14 or higher (based on the total weight of the oil). List of typical oils which can be used, but not limited to obtain stable emulsions are carbon black feedstock oils (CBFS), phenolic oil, anthracene oils, (short-medium-long chain) fatty acids, fatty acids esters and paraffins. The oil is preferably a C14 or higher. In one embodiment, the oil preferably has high aromaticity. Within the field, the aromaticity is preferably characterized in terms of the Bureau of Mines Correlation Index (BMCI). The oil preferably has a BMCI>50. In one embodiment, the oil is low in aromaticity, preferably having a BMCI<15.

CBFS is an economically attractive oil source in the context of the invention, and is preferably a heavy hydrocarbon mix comprising predominantly C14 to C50, the sum of C14-C50 preferably amounting to at least 50 wt %, more preferably at least 70 wt % of the feedstock. Some of the most important feedstocks used for producing carbon black include clarified slurry oil (CSO) obtained from fluid catalytic cracking of gas oils, ethylene cracker residue from naphtha steam cracking and coal tar oils. The presence of paraffins (<C15) substantially reduces their suitability, and a higher aromaticity is preferred. The concentration of aromatics determines the rate at which carbon nuclei are formed. The carbon black feedstock preferably has a high BMCI to be able to offer a high yield with minimum heat input hence reducing the cost of manufacturing. In a preferred embodiment, and in accordance with current CBFS specifications, the oil, including mixtures of oil, has a BMCI value of more than 120. While the skilled person has no difficulties understanding which are suitable CBFS, merely as a guide it is noted that—from a yield perspective—a BMCI value for CBFS is preferably more than 120, even more preferably more than 132. The amount of asphaltene in the oil is preferably lower than 10 wt %, preferably lower than 5.0 wt % of the CBFS weight. The CBFS preferably has low sulfur content, as sulfur adversely affects the product quality, leads to lower yield and corrodes the equipment.

It is preferred that the sulfur content of the oil according to ASTM D1619 is less than 8.0 wt %, preferably below 4.0 wt % more preferably less than 2.0 wt %.

The emulsion, preferably a CBFS-comprising emulsion, is a "single-phase emulsion" which is understood to mean that the oil phase and the water phase optically appear as one miscible mixture showing no physical separation of oil, water or surfactant to the naked eye. The single-phase emulsion can be a macro-emulsion or a micro-emulsion, and can be either kinetically or thermodynamically stable. The process by which an emulsion completely breaks (coalescence), i.e. the system separates into bulk oil and water phases, is generally considered to be controlled by four different droplet loss mechanisms, i.e., Brownian flocculation, creaming, sedimentation flocculation and disproportionation.

A 'stable single-phase emulsion' within the context of the invention is understood to mean that the emulsion shows no physical separation visible to the eye, preferably reflected in terms of the emulsion not showing any change in pH by more than 1.0 pH unit and/or the emulsion not showing any change in viscosity by more than 20%, over a period of time that exceeds the carbon structure network production time. The term 'stable' can mean 'thermodynamically stable' or 'kinetically stable' (by adding energy, i.e. through mixing). In practice, the single-phase emulsion is regarded stable if no de-mixing optically arises, i.e. a single-phase is retained, for a period of at least 1 minute after preparation of the emulsion. It is thus preferred that the emulsion maintains its pH within 1.0 pH unit and/or its viscosity with less than 20% variation over a period of time of at least 1 minute, preferably at least 5 minutes after preparation. While for handling purposes an extended stability is preferred, it is noted that the manufacturing process can still benefit from using emulsions stable over relatively short time spans of 1 minute, preferably 5 minutes: By adding energy (mixing) the stability of the emulsion can be extended, and short-term stability can be extended using in-line mixing. While macro-emulsions are not thermodynamically stable, and will always revert to their original, immiscible separate oil and water phases, the break down rate can be sufficiently slow to render it kinetically stable for the length of the manufacturing process.

Provided that a stable, single-phase emulsion is obtained, the amounts of water and oil are not regarded limiting, but it is noted that reduced amounts of water (and increased amounts of oil) improve yields. The water content is typically between 5 and 50 wt % of the emulsion, preferably 10-40 wt %, even more preferably up to 30 wt %, more preferably 10-20 wt % of the emulsion. While higher amounts of water can be considered, it will be at the cost of yield. Without wishing to be bound by any theory, the inventors believe that the water phase attributes to the shape and morphology of the networks thus obtained.

The choice of surfactant(s) is not regarded a limiting factor, provided that the combination of the oil, water and surfactant(s) results in a stable micro-emulsion as defined here above. As further guidance to the skilled person, it is noted that the surfactant can be selected on the basis of the hydrophobicity or hydrophilicity of the system, i.e. the hydrophilic-lipophilic balance (HLB). The HLB of a surfactant is a measure of the degree to which it is hydrophilic or lipophilic, determined by calculating values for the different regions of the molecule, according to the Griffin or Davies method. The appropriate HLB value depends on the type of oil and the amount of oil and water in the emulsion, and can be readily determined by the skilled person on the basis of the requirements of retaining a thermodynamically stable, single phase emulsion as defined above. It is found that an emulsion comprising more than 50 wt % oil, preferably having less than 30 wt % water phase, would be stabilized best with a surfactant having an HLB value above 7, preferably above 8, more preferably above 9, most preferably above 10. On the other hand, an emulsion with at most 50 wt % oil would be stabilized best with a surfactant having an HLB value below 12, preferably below 11, more preferably below 10, most preferably below 9, particularly below 8. The surfactant is preferably selected to be compatible with the oil phase. In case the oil is a CBFS-comprising emulsion with a CBFS, a surfactant with high aromaticity is preferred, while an oil with low BMCI, such as characterized by BMCI<15, would be stabilized best using aliphatic surfactants. The surfactant(s) can be cationic, anionic or non-ionic, or a mixture thereof. One or more non-ionic surfactants are preferred, in order to increase the yields since no residual ions will be left in the final product. In order to obtain a clean tail gas stream, the surfactant structure is preferably low in sulfur and nitrogen, preferably free from sulfur and nitrogen. Non-limiting examples of typical non-ionic surfactants which can be used to obtain stables emulsions are commercially available series of tween, span, Hypermer, Pluronic, Emulan, Neodol, Triton X and Tergitol.

In the context of the invention, a micro-emulsion is a dispersion made of water, oil (preferably CBFS), and surfactant(s) that is a single optically isotropic and thermodynamically stable liquid with dispersed domain diameter varying approximately from 1 to 500 nm, preferably 1 to 100 nm, usually 10 to 50 nm. In a micro-emulsion the domains of the dispersed phase are either globular (i.e. droplets) or interconnected (to give a bicontinuous micro-emulsion). In a preferred embodiment, the surfactant tails form a continuous network in the oil-phase of a water-in-oil (w/o) emulsion or bicontinuous emulsion. The water domains should contain a metal catalyst, preferably having an average particle size between 1 nm and 100 nm.

The single-phase emulsion, i.e. a w/o or bicontinuous micro-emulsion, preferably a bicontinuous micro-emulsion, further comprises metal catalyst nanoparticles preferably having an average particle size between 1 and 100 nm. The skilled person will find ample guidance in the field of carbon nanotubes (CNTs) to produce and use these kinds of nanoparticles. These metal nanoparticles are found to improve network formation in terms of both rates and yields, and reproducibility. Methods for manufacturing suitable metal nanoparticles are found in Vinciguerra et al. "*Growth mechanisms in chemical vapour deposited carbon nanotubes*" Nanotechnology (2003) 14, 655; Perez-Cabero et al. "*Growing mechanism of CNTs: a kinetic approach*" J. Catal. (2004) 224, 197-205; Gavillet et al. "*Microscopic mechanisms for the catalyst assisted growth of single-wall carbon nanotubes*" Carbon. (2002) 40, 1649-1663 and Amelinckx et al. "*A formation mechanism for catalytically grown helix-shaped graphite nanotubes*" Science (1994) 265, 635-639, their contents about manufacturing metal nanoparticles herein incorporated by reference.

The metal catalyst nanoparticles are used in a bicontinuous or w/o microemulsion, preferably a CBFS-comprising bicontinuous or w/o micro-emulsion. In one embodiment, a bicontinous micro-emulsion is most preferred. Advantageously, the uniformity of the metal particles is controlled in said (bicontinuous) micro-emulsion by mixing a first (bicontinuous) micro-emulsion in which the aqueous phase contains a metal complex salt capable of being reduced to the ultimate metal particles, and a second (bicontinuous) micro-emulsion in which the aqueous phase contains a reductor capable of reducing said metal complex salt; upon mixing the metal complex is reduced, thus forming metal particles. The controlled (bicontinuous) emulsion environment stabilizes the particles against sintering or Ostwald ripening. Size, concentrations and durability of the catalyst particles are readily controlled. It is considered routine experimentation to tune the average metal particle size within the above range, for instance by amending the molar ratio of metal precursor vs. the reducing agent. An increase in the relative amount of reducing agent yields smaller particles. The metal particles thus obtained are monodisperse, deviations from the average particle size are preferably within 10%, more preferably within 5%. Also, the present technology provides no restraint on the actual metal precursor, provided it can be reduced. Non-limiting examples of effective catalyst species are the noble metals (Pt, Pd, Au, Ag), iron-family elements (Fe, Co and Ni), Ru, and Cu. Suitable metal complexes are but are not limited to (i) platinum precursors such as $H_2PtCl_6$; $H_2PtCl_6.xH_2O$; $K_2PtCl_4$; $K_2PtCl_4.xH_2O$; $Pt(NH_3)_4(NO_3)_2$; $Pt(C_5H_7O_2)_2$, (ii) ruthenium precursors such as $Ru(NO)(NO_3)_3$; $Ru(dip)_3Cl_2$ [dip=4,7-diphenyl-1,10-fenanthroline]; $RuCl_3$, or (iii) palladium precursors such as $Pd(NO_3)_2$, or (iv) nickel precursors such as $NiCl_2$ or $NiCl_2.xH_2O$; $Ni(NO_3)_2$; $Ni(NO_3)_2.xH_2O$; $Ni(CH_3COO)_2$; $Ni(CH_3COO)_2.xH_2O$; $Ni(AOT)_2$ [AOT=bis(2-ethylhexyl) sulphosuccinate]. Non-limiting suitable reducing agents are hydrogen gas, sodium boron hydride, sodium bisulphate, hydrazine or hydrazine hydrate, ethylene glycol, methanol and ethanol. Also suited are citric acid and dodecylamine. The type of metal precursor is not an essential part of the invention. The metal of the particles of the (bicontinuous) micro-emulsion are preferably selected from the group consisting of Pt, Pd, Au, Ag, Fe, Co, Ni, Ru and Cu, and mixtures thereof, in order to control morphology of the carbon structures networks ultimately formed. The metal nanoparticles end up embedded inside these structures where the metal particles are physically attached to the structures. While there is no minimum concentration of metal particles at which these networks are formed—in fact networks are formed using the modified carbon black manufacturing process according to the invention—it was found that the yields increase with the metal particle concentrations. In a preferred embodiment, the active metal concentration is at least 1 mM, preferably at least 5 mM, preferably at least 10 mM, more preferably at least 15 mM, more preferably at least 20 mM, particularly at least 25 mM, most preferably up to 3500 mM, preferably up to 3000 mM. In one embodiment, the metal nanoparticles comprise up to 250 mM. These are concentrations of the catalyst relative to the amount of the aqueous phase of the (bicontinuous) micro-emulsion.

Atomization of the single-phase emulsion, preferably a CBFS-comprising emulsion, is preferably realized by spraying, using a nozzle-system 4, which allows the emulsion droplets to come in contact with the hot waste gas a1 in the reaction zone 3b, resulting in traditional carbonization, network formation and subsequent agglomeration, to produce crystalline carbon structure networks e according to the invention. The injection step preferably involves increased temperatures above 600° C., preferably between 700 and 3000° C., more preferably between 900 and 2500° C., more preferably between 1100 and 2000° C.

Figure 1B:
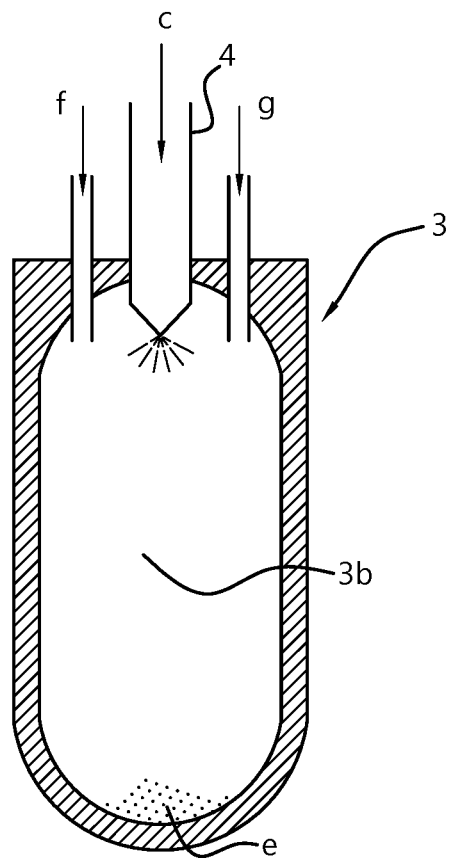
FIG. 1B is a schematic diagram of a semi-batch carbon black producing process where a single-phase emulsion c is atomized through a nozzle 4 at the top of the reactor 3 into the reactor zone 3b at elevated temperatures, carbonizing said emulsion at the elevated temperature in the reactor zone 3b, and collecting the crystalline carbon structure networks e at the bottom of the reactor. Additionally two gas-inlets are present that enter the reactor from the top, for adding inert gas f, preferably nitrogen for controlling and/or depletion of oxygen-levels, and for introducing a carbon-containing gas g into the reactor, preferably acetylene or ethylene.

In a different but related aspect of the invention, the invention pertains to a process for the semi-batch production of the crystalline carbon structure networks according to the invention in a reactor 3 where a single-phase emulsion c according to the invention is injected from the top of the reactor 3, preferably through spraying using an aerosol inlet 4, to obtain an aerosol, and wherein said networks e are formed at a temperature of at least 600° C., preferably 700-1200° C. and deposited at the bottom of the reactor furnace. The elevated temperature and reaction conditions may be achieved using pyrolysis (e.g. heat source outside reactor, using N2, depleted of oxygen) or by combustion (heat source inside reactor, using air or oxygen). In a further embodiment, the semi-batch process is conveniently operated with a carbon feed gas above its cracking temperature such as methane, ethane, propane, butane, ethylene, acetylene and propylene, carbon monoxide, oxygenated hydrocarbons such as methanol; aromatic hydrocarbons such as toluene, benzene and naphthalene, and mixtures of the above, for example carbon monoxide and methane. Reference is made to FIG. 1B. Typical residence times are extended compared to the preferred furnace black process, with residence times of the emulsion in the reactor typically in the order of 1 hours to 7 days, more preferably 8 hours to 3 days. The single-phase emulsion is as defined before, i.e. a water-in-oil (w/o) micro-emulsion or a bicontinuous micro-emulsion comprising metal catalyst nanoparticles.

Related therewith, the invention also pertains to a process for the continuous production of the crystalline carbon structure networks in a reactor 3 where a single-phase emulsion c according to the invention is injected from the top of the reactor 3, said reactor preferably being a thermal black reactor, preferably through spraying using an aerosol inlet 4, to obtain an aerosol, and wherein said networks e are formed at an increased temperature of at least 600° C., preferably 700-1200° C. and deposited at the bottom of the reactor, and wherein the increased temperature is obtained using combustion (heat source inside reactor, using air or oxygen), but wherein the emulsion is injected only under pyrolysis conditions. In a further embodiment, the continuous 'pyrolysis' process encompassing an initial combustion step is conveniently operated with a carbon feed gas above its cracking temperature such as methane, ethane, propane, butane, ethylene, acetylene and propylene, carbon monoxide, oxygenated hydrocarbons such as methanol; aromatic hydrocarbons such as toluene, benzene and naphthalene, and mixtures of the above, for example carbon monoxide and methane. Reference is made to FIG. 1B. The residence time for the emulsion in the reactor is preferably in the range of 1 to 600 seconds, more preferably 5 to 60 seconds. The single-phase emulsion is as defined before, i.e. a water-in-oil (w/o) micro-emulsion or a bicontinuous micro-emulsion comprising metal catalyst nanoparticles.

According to the above semi-batch and continuous processes of the invention, crystalline carbon structure networks (i.e. networks of crystalline carbon structures) can be produced. In a related aspect, the invention thus pertains to crystalline carbon structure networks obtained by or obtainable by the process of the invention. The term "carbon structures" are understood to comprise crystalline sp2-based carbon allotropes, i.e. substances in which a carbon atom is bonded to neighbouring three carbon atoms in a hexagonal pattern, including graphene, fullerene, carbon nanofibers and carbon nanotubes. The method of the invention allows for the growth of crystalline carbon structure networks formed from carbon structures that are chemically interconnected through a multitude of junctions, including Y- and H-junctions. In the context of the invention, a 'network' is preferably understood to comprise at least 3, preferably at least 5, more preferably at least 10, more preferably at least 100, more preferably at least 500 chemically connected nodes.

The networks preferably have at least one, preferably at least two, more preferably at least three, most preferably all of the following properties:
  (i) Iodine Adsorption Number (IAN) of at least 250 mg/g, more preferably at least 300 mg/g, preferably 300-1000 mg/g, according to ASTM D1510;
  (ii) Nitrogen Surface Area (N2SA) of at least 250 m2/g, more preferably at least 300 m2/g, preferably 300-1000 m2/g, according to ASTM D6556;
  (iii) Statistical Thickness Surface Area (STSA) of at least 120 m2/g, more preferably at least 150 m2/g, preferably 150-1000 m2/g, according to ASTM D6556;
  (iv) Oil Absorption Number (OAN) of at least 150 cc/100 g, preferably 150-500 cc/100 g according to ASTM D2414, wherein:
IAN=Iodine Adsorption Number: the number of grams of iodine adsorbed per kilogram of carbon black under specified conditions as defined in ASTM D1510;
N2SA=nitrogen surface area: the total surface area of carbon black that is calculated from nitrogen adsorption data using the B.E.T. theory, according to ASTM D6556;
STSA=statistical thickness surface area: the external surface area of carbon black that is calculated from nitrogen adsorption data using the de Boer theory and a carbon black model, according to ASTM D6556; and
OAN=Oil Absorption Number: the number of cubic centimeters of dibutyl phthalate (DBP) or paraffin oil absorbed by 100 g of carbon black under specified conditions. The OAN value is proportional to the degree of aggregation of structure level of the carbon black, determined according to ASTM D2414.

For each of IAN, N2SA (or NSA), STSA and OAN—all typical parameters for characterizing carbon black materials—the networks exhibit superior properties compared to traditional carbon black. The networks of the invention are preferably characterized by at least one, preferably at least two, more preferably all of (i), (ii) and (iii) since these are typical ways of characterized the surface area properties of the materials. In one embodiment, the networks exhibit at least one of (i), (ii) and (iii), and further comply with (iv).

These structures forming the network may be described as nanofibers, which are solid (i.e. non-hollow), preferably having an average diameter or thickness of 1-400 nm, more preferably between 5 and 350 nm, more preferably up to 100 nm, in one embodiment 50-100 nm, compared to the average particle size of 8-500 nm for spherical carbon black particles. In one embodiment, the average fiber length (i.e. the average distance between two junctions) is preferably in the range of 100-10,000 nm, more preferably 200-5000 nm, more preferably 500-5000 nm, as for instance can be determined using SEM. Alternatively, the nanofibers or structures may preferably be described in terms of an average aspect ratio of fiber length-to-thickness of at least 2, preferably at least 3, more preferably at least 4, most preferably at least 5; in sharp contrast with the amorphous (physically associated) aggregates formed from spherical particles obtained through conventional carbon black manufacturing. The aggregates of carbon structure networks according to the invention are typically of the order of 0.1-100 microns, preferably 1-50 microns, which is observed with Laser Diffraction and Dynamic Light Scattering analysis.

The invention also pertains to a composite comprising carbon structure networks according to the invention, further comprising one or more polymers, for instance for adding mechanical strength, electrical conductivity or thermal conductivity to said polymer-based composite. The networks may be added in any amount adapted to the desired performance, e.g. 1-70 wt %, more preferably 10-50 wt %, even more preferably between 20-40 wt %, based on the total polymer weight in the composite. In one aspect, the composite shows a network concentration-dependent elasticity modulus (E-modulus, i.e. an increase with increasing concentration of networks) for instance as measured according to ISO 527.

EXAMPLES

Example 1A. Preparation of Crystalline Carbon Structure Network 100 gallon of feedstock were prepared comprising of:
  a) Carbon Black slurry oil (CBO or CBFS oil)
  b) Water phase containing 3500 mM metal precursor salt (FeCl3)
  c) Water phase containing reducing agent (3650 mM citric acid)
  d) Surfactant (TritonX; HLB 13.4).

The exact composition of the micro-emulsions (a+b+d) and (a+c+d) was detailed below:

| Emulsion | CBO | Water/FeCl$_3$ | Water/CA | TritonX |
|---|---|---|---|---|
| a + b + d | 70% | 10% | 0% | 20% |
| a + c + d | 70% | 0% | 10% | 20% |

Both micro-emulsions (a+b+d) and (a+c+d) were added together and a single-phase micro-emulsion was obtained by stirring, and said micro-emulsion was stable for more than one hour, which was longer than the entire length of the experiment.

The networks thus obtained had the following characteristics:
  IAN=382.5 mg/g, according to ASTM D1510
  N2SA=350 m2/g (ASTM D6556)
  STSA=160.6 m2/g (ASTM D6556)
  OAN=170 cc/100 g (ASTM D2414).

Example 2. Carbon Black vs Network

The carbon networks according to example 1 were compared to conventional carbon black produced using (a). Standard grade carbon black typically has a nitrogen surface area (NSA or N2SA) varying up to 150 m2/g (N100-grade rubber carbon black).

Figure 2A:
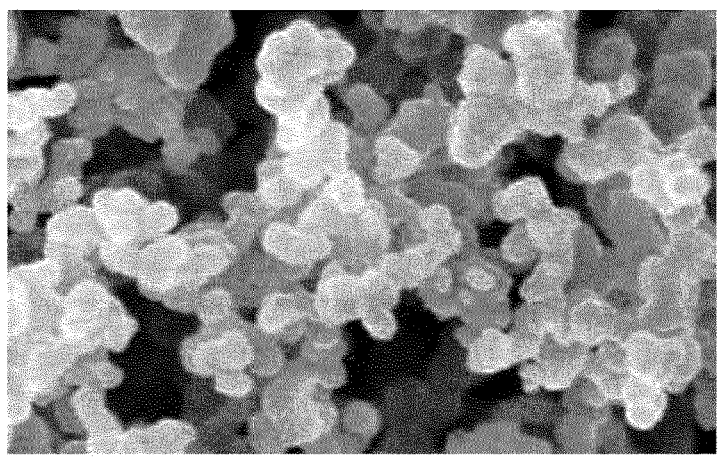
FIGS. 2A and 2B are SEM pictures of carbon black and carbon structure networks, respectively.
Figure 2B:
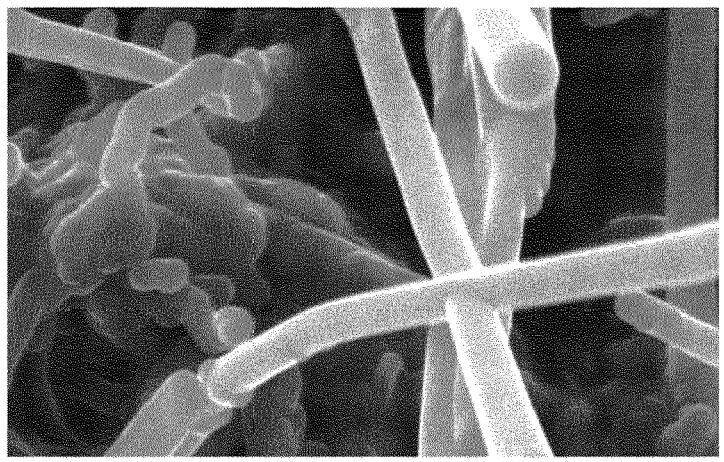

The morphology of the carbon networks was assessed by Scanning Electron Microscopy (SEM). It was found that the carbon network building blocks were chemically covalently linked solid carbon (nano)fibers with average fibre diameters below 100 nm. On the other hand, the carbon black building blocks were nodules in which graphitic layers are organized in a spherical shape (8-300 nm diameter). SEM pictures of carbon black and carbon networks building blocks are shown in FIGS. 2A and 2B, respectively. It was found that the carbon networks were organized in aggregate size 1-100 µm, while carbon blacks aggregates ranged typically from 85-500 nm.

Example 3: Effect of Metal Nanoparticles

The metal catalyst concentration had an effect on the final yields of the reactions: Three 20 g bicontinuous microemulsions were made from isopropylpalmitate (35% wt), butanol (11.25% wt), Tween 80 (33.75% wt), water (20% wt). While the first batch was prepared without any metal nanoparticles, two batches involved 50 and 200 mM FeCl3 metal nanoparticles (based on citric acid and FeCl3 with ratio 10:1). Each of the emulsions were stable over the full length of the experiments. The experiment without metal nanoparticles was carried out at least 10 times.

In each case, the emulsions were introduced in the middle of a quartz-tube of a thermal horizontal tube reactor. The reactor was heated up to 750° C. (3 K/min) under 130 sccm of nitrogen flow and kept for 90 min at the same temperature. In the first 60 min the nitrogen gas flow was reduced to 100 sccm and ethylene gas was added at 100 sccm flow. During the last 30 minutes at 750° C. the ethylene was purged out from nitrogen at 130 sccm for the last 30 min and the reactor was then cooled down.

It is only with metal nanoparticles that carbon structure networks were obtained. In none of the ten experiments without metal nanoparticles networks were found. The test done in the presence of 200 mM FeCl3 showed a yield increase of carbon structure networks, compared to the results reported with 50 mM FeCl3.

Figure 3:
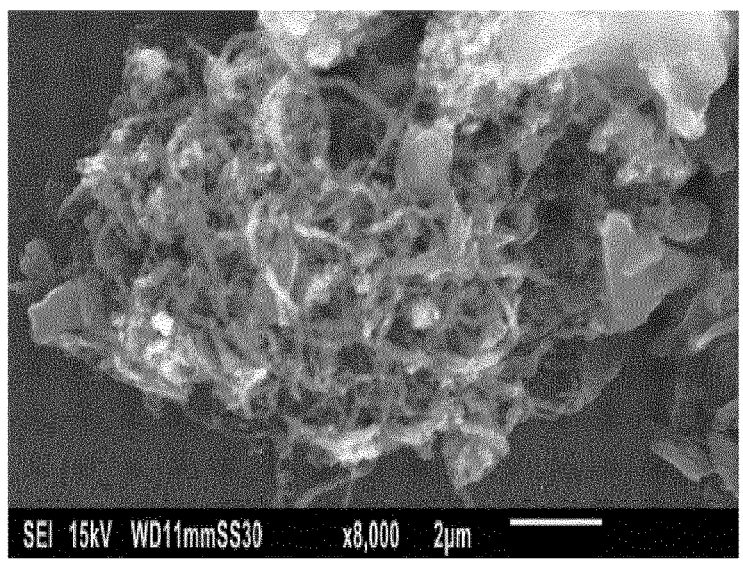
FIG. 3 shows a SEM picture of crystalline carbon structure networks obtained in a bicontinuous microemulsion with 100 mM FeCl3 metal catalyst.

A SEM picture of the networks obtained with a bicontinuous micro-emulsion based on isopropylpalmitate (35% wt), butanol (11.25% wt), Tween 80 (33.75% wt) and water (20% wt), with 100 mM Fe nanoparticles is shown in FIG. 3.

Example 4: Graph E-modulus in PA6

Figure 4:
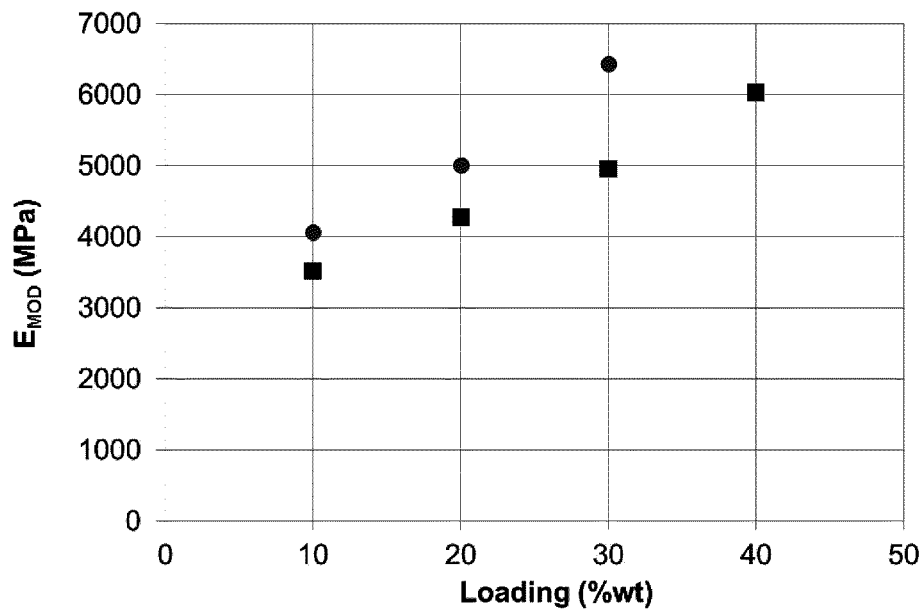
FIG. 4 depicts the elasticity modulus according to ISO 527 for carbon networks (squares) and glass fibers (circles), showing mechanical strength for the crystalline networks that is comparable to that of the fibers. Carbon black was found not to bring any reinforcing properties to the composite.

Carbon Network powder such as prepared according to the recipe of example 1 was compounded in different loadings (10, 20, 30, 40% wt) in Polyamide 6 (Akulon F223D), by means of a twin screw extruder (L/D=38, D=25 mm) and compared to glass fiber (Chopvantage 3540) compounded at 10, 20, 30% wt loadings under the same conditions. The E modulus was measured according to ISO 527, dried as molded tensile bars. The results are plotted in FIG. 4, and indicate a performance of carbon networks, which is comparable to that of glass fibers. Carbon black was found not to provide significant reinforcement in thermoplastic, at whatever concentration.

Example 5: Graph Electrical Conductivity PA6 and PET

Figure 5:
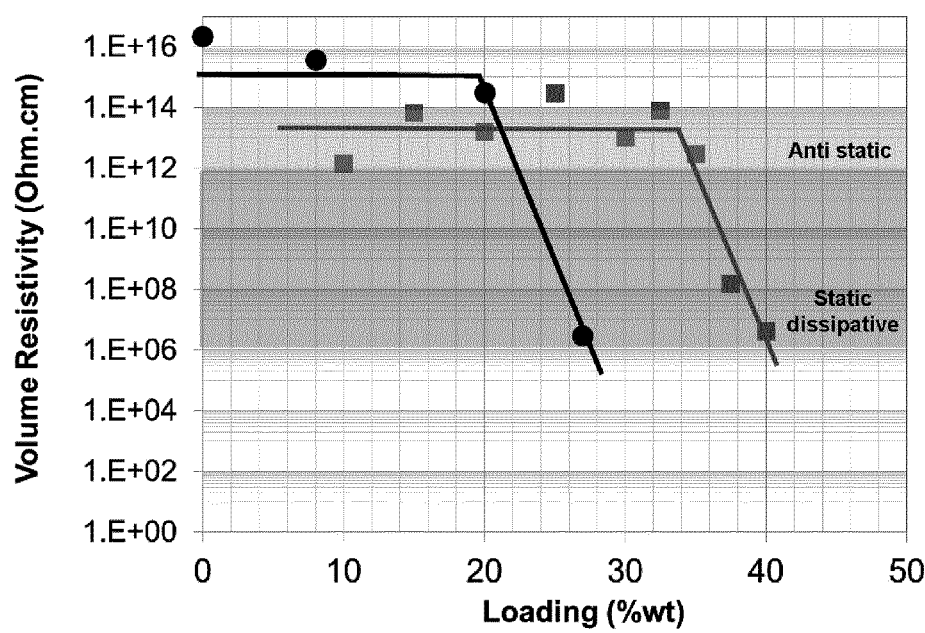
FIG. 5 shows volume resistivity for different compounds (polyamide PA6; squares; PET: circles) prepared with different loadings of crystalline carbon structure networks prepared using the recipe according to example 1.

Volume resistivity was measured on different compounds prepared with carbon network prepared using the recipe according to example 1, in different loadings in Polyamide 6 (Akulon F223D) and PET (Ramapet N1), by means of a twin-screw extruder (L/D=38, D=25 mm). The results are plotted in FIG. 5. The percolation curves show good dosage control in the static dissipative range and that high conductive performances are achieved at high loadings. At the opposite, carbon black percolation threshold for conductive applications was found at lower dosages, i.e. <20% wt, and dosage control in the static dissipative range was unsatisfactory. Moreover, carbon networks compounds did not slough up to 30% wt loading, whereas carbon black compounds are known to be sloughing also at low filling degree.

Example 6: Mechanical Strength

Carbon nanofiber networks (low IAN, high crystallinity) obtained through the modified carbon black manufacturing process according to the invention were found capable of enhancing the mechanical properties of thermoplastic (and thermoset) polymer resins. Adding 10% by weight of carbon nanofiber networks to a polypropylene co-polymer resulted in an increase in tensile strength (at break) of 15% and an elasticity modulus increase of 16% compared to the neat polymer reference. A Brabender© Plasticorder© was used for mixing sufficient amount of carbon nanofiber networks and polypropylene at 210° C. and 80 rpm. Samples were compression moulded and tested with an Instron 3366 10 kN tensile tester at 23° C., 50% RH.

| 10% CarbonX/ PP | Modulus (Young's Tensile stress 0.05%-0.25%) (MPa) | Tensile stress at Yield (Zero Slope) (MPa) | Tensile strain at Yield (Zero Slope) (%) | Tensile stress at Break (Automatic Load Drop) (MPa) | Tensile strain at Break (Automatic Load Drop) (%) |
|---|---|---|---|---|---|
| Average | 1459.99 | 20.05 | 7.68 | 19.76 | 9.80 |
| Std dev | 149.72 | 1.13 | 0.20 | 1.14 | 0.91 |
|  | 10.3% | 5.6% | 2.6% | 5.8% | 9.3% |

| PP reference | Modulus (Young's Tensile stress 0.05%-0.25%) (MPa) | Tensile stress at Yield (Zero Slope) (MPa) | Tensile strain at Yield (Zero Slope) (%) | Tensile stress at Break (Automatic Load Drop) (MPa) | Tensile strain at Break (Automatic Load Drop) (%) |
|---|---|---|---|---|---|
| Average | 1258.35 | 18.95 | 8.76 | 17.14 | 13.54 |
| Std dev | 141.14 | 1.17 | 0.89 | 1.37 | 4.30 |
|  | 11.2% | 6.2% | 10.2% | 8.0% | 31.7% |

Example 7: Production by Means of Plasma Reactor

Carbon nanofiber networks produced by means of using a plasma instead of combustion of a carbon gas. The plasma gas used was nitrogen (N2) at 60 kW with an initial plasma flow rate of 12 Nm3/h. Argon flow rate was set at 0.6 Nm3/h. Feedstock (emulsion) flow rate was set at 2.5 kg/h. GC-measurements were done to monitor H2 and progress of the carbon conversion. Temperature at injection was set at 1400° C., approximated residence time was 4 seconds. The collected material has a density of 0.13 g/cc and showed presence of carbon nanofiber networks observed via SEM and TEM, see figures. The average fiber diameter was determined to be 70 nm, while the length in-between was 5 to 10 times fiber diameter.

The invention claimed is:

1. A process for the production of crystalline carbon structure networks in a reactor, which comprises a reaction zone and a termination zone, the process comprising:
    (a) injecting a water-in-oil or bi-continuous micro-emulsion comprising carbon components in an oil phase, metal nanoparticles having a size between 1 and 100 nm, and water into the reaction zone, which is at a temperature of above 600° C. to produce crystalline carbon structure networks,
    (b) transferring the networks to the termination zone, and
    (c) spraying water into the termination zone thereby quenching or stopping the formation of crystalline carbon structure networks.

2. The process according to claim 1, wherein the reaction zone has a temperature between 600 and 2500° C.

3. The process according to claim 1, wherein the reactor is a furnace carbon black reactor, comprising, along the axis of the reactor, a combustion zone, a reaction zone and a termination zone.

4. The process according to claim 1, further comprising:
    (i) producing a stream of hot waste gas in a combustion zone by burning a fuel in an oxygen-containing gas, and
    (ii) passing the waste gas from the combustion zone into the reaction zone prior to injecting the micro-emulsion of (a).

5. The process according to claim 1, wherein the oil phase comprises aromatic and/or aliphatic compounds.

6. The process according to claim 5, wherein at least 50 wt % of the aromatic and/or aliphatic compounds is C14 or higher.

7. The process according to claim 1, wherein the micro-emulsion comprises at least 1 mM of the metal nanoparticles.

8. The process according to claim 7, wherein the micro-emulsion is a bi-continuous micro-emulsion.

9. The process according to claim 1, wherein the metal nanoparticles comprise Pt, Pd, Au, Ag, Fe, Co, Ni, Ru and Cu, and mixtures thereof.

10. The process according to claim 1, wherein the metal nanoparticles comprise a metal complex selected from the group consisting of $H_2PtCl_6$; $H_2PtCl_6xH_2O$; $K_2PtCl_4$; $K_2PtCl_4xH_2O$; $Pt(NH_3)_4(NO_3)_2$; $Pt(C_5H_7O_2)_2$; $Ru(NO)(NO_3)_3$; $Ru(4,7$-diphenyl-$1,10$-fenanthroline$)_3Cl_2$; $RuCl_3$, $Pd(NO_3)_2$; $NiCl_2$ or $NiCl_2xH_2O$; $Ni(NO_3)_2$; $Ni(NO_3)_2xH_2O$; $Ni(CH_3COO)_2$; $Ni(CH_3COO)_2.xH_2O$; and $Ni(bis(2$-ethylhexyl)sulphosuccinate$)_2$.

11. A process for the batch production of the crystalline carbon structure networks in a reactor comprising a reaction zone and a termination zone, the process comprising:
(a) injecting a water-in-oil or bi-continuous micro-emulsion comprising carbon components in an oil phase, metal nanoparticles having a size between 1 and 100 nm, and water from a top of the reactor into the reaction zone, which is maintained at an increased temperature of at least 600° C. using pyrolysis or combustion,
(b) transferring crystalline carbon structure networks deposited at the bottom of the reactor to the termination zone, and
(c) quenching or stopping reactions in the termination zone with sprayed water.

12. The process according to claim 11, wherein the increased temperature is between 700-1200° C.

13. The process according to claim 11, wherein the injection is via spraying using an aerosol inlet.

14. A process for the continuous production of the crystalline carbon structure networks in a furnace reactor comprising a reaction zone and a termination zone, the process comprising:
(a) injecting a water-in-oil or bi-continuous micro-emulsion comprising carbon components in an oil phase, metal nanoparticles having a size between 1 and 100 nm, and water from a top of the reactor into the reaction zone to obtain an aerosol, wherein the reaction is maintained at an increased temperature of at least 600° C. using combustion,
(b) transferring crystalline carbon structure networks deposited at the bottom of the reactor to the termination zone, and
(c) quenching or stopping reactions in the termination zone with sprayed water, wherein the emulsion is injected only under pyrolysis conditions.

15. The process according to claim 14, wherein the reactor is a thermal black reactor.

* * * * *